US008070892B2

(12) United States Patent
Jeong et al.

(10) Patent No.: US 8,070,892 B2
(45) Date of Patent: Dec. 6, 2011

(54) HIGH FE CONTAINED ZIRCONIUM ALLOY COMPOSITIONS HAVING EXCELLENT CORROSION RESISTANCE AND PREPARATION METHOD THEREOF

(75) Inventors: Yong Hwan Jeong, Daejeon (KR); Hyun Gil Kim, Daejeon (KR); Sang Yoon Park, Daejeon (KR); Myung Ho Lee, Daejeon (KR); Byoung Kwon Choi, Daejeon (KR); Jong Hyuk Baek, Daejeon (KR); Jeong Yong Park, Daejeon (KR); Jun Hwan Kim, Daejeon (KR)

(73) Assignees: Korea Atomic Energy Research Institute, Daejeon (KR); Korea Hydro and Nuclear Power Co. Ltd., Seoul (KR)

( * ) Notice: Subject to any disclaimer, the term of this patent is extended or adjusted under 35 U.S.C. 154(b) by 889 days.

(21) Appl. No.: 11/734,288

(22) Filed: Apr. 12, 2007

(65) Prior Publication Data

US 2008/0192880 A1      Aug. 14, 2008

(30) Foreign Application Priority Data

Feb. 9, 2007   (KR) .................. 10-2007-0013871

(51) Int. Cl.
*C22C 16/00*   (2006.01)
*C22F 1/18*    (2006.01)
(52) U.S. Cl. .................. 148/421; 148/672; 420/423
(58) Field of Classification Search .......... 148/421, 148/672; 420/422, 423
See application file for complete search history.

(56) References Cited

U.S. PATENT DOCUMENTS

| 4,938,920 A * | 7/1990 | Garzarolli et al. ............ 376/457 |
| 5,112,573 A | 5/1992 | Foster et al. |
| 5,125,985 A | 6/1992 | Foster et al. |
| 5,211,774 A | 5/1993 | Garde et al. |
| 5,266,131 A | 11/1993 | Foster et al. |
| 5,560,790 A | 10/1996 | Nikulina et al. |
| 5,648,995 A | 7/1997 | Mardon et al. |
| 5,940,464 A | 8/1999 | Mardon et al. |
| 6,811,746 B2 * | 11/2004 | Jeong et al. .................. 420/422 |
| 2006/0243358 A1 * | 11/2006 | Colburn et al. ............... 148/672 |

FOREIGN PATENT DOCUMENTS

EP           0 198 570       10/1996

OTHER PUBLICATIONS

Garzarolli et al., "Behavior and Properties of Zircaloys in Power Reactors: A Short Review of Pertinent Aspects in LWR Fuel", American Society for Testing and Materials, 1996, pp. 12-32.
Garzarolli et al., "Corrosion Optimized Zircaloy for Boiling Water Reactor (BWR) Fuel Elements", American Society for Testing and Materials, Philadelphia, 1994, pp. 709-723.
Eucken et al., "Influence of Chemical Composition on Uniform Corrosion of Zirconium-Base Alloys in Autoclave Tests", American Society for Testing and Materials, Philadelphia, 1989, pp. 113-127.
Jeong et al., Effect of β Phase, Precipitate and Nb-Concentration in Matrix on Corrosion and Oxide Characteristics of Zr-xNb Alloys, Journal of Nuclear Materials, 317, (2003) pp. 1-12.
Ock et al., "Corrosion Characteristics of Zr-based Alloys with Cu Addition", J. Kor. Inst. Met. & Mat., vol. 42, No. 2 (2004), pp. 178-186.

* cited by examiner

*Primary Examiner* — George Wyszomierski
*Assistant Examiner* — Janelle Morillo
(74) *Attorney, Agent, or Firm* — Bachman & LaPointe, P.C.

(57) ABSTRACT

A high Fe-containing zirconium composition having excellent corrosion resistance and a preparation method thereof. Specifically, disclosed are a high Fe-containing zirconium composition having excellent corrosion resistance and a preparation method thereof, the composition comprising: 0.5-1.0 wt % iron; 0.25-0.5 wt % chromium; 0.06-0.18 wt % oxygen; at least one element selected from the group consisting of 0.2-0.5 wt % tin, 0.1-0.3 wt % niobium and 0.05-0.3 wt % copper; and the balance of zirconium. The zirconium alloy has excellent corrosion resistance, and thus can be used as a material for nuclear fuel claddings, spacer grids and nuclear reactor core structures in light water reactor and heavy water reactor nuclear power plants.

10 Claims, No Drawings

HIGH FE CONTAINED ZIRCONIUM ALLOY COMPOSITIONS HAVING EXCELLENT CORROSION RESISTANCE AND PREPARATION METHOD THEREOF

BACKGROUND OF THE INVENTION

1. Field of the Invention

The present invention relates to a high Fe-containing zirconium alloy composition having excellent corrosion resistance and a preparation method thereof.

2. Description of the Prior Art

Nuclear fuel claddings, spacer grids, and nuclear reactor core structures, which are used in nuclear fuel assemblies in nuclear power plants, become brittle due to high-temperature/high-pressure corrosive environment and neutron irradiation, and suffer reduction in mechanical properties due to a phenomenon of corrosion product growth, and thus alloy compositions thereof are very important. Accordingly, zirconium alloys having low neutron absorption cross sections and excellent mechanical strength and corrosion resistance have been widely applied in pressurized water reactors (PWRs) and boiling water reactors (BWRs) for several decades. Among zirconium alloys developed to date, Zircaloy-2 (comprising 1.20-1.70 wt % tin, 0.07-0.20 wt % iron, 0.05-1.15 wt % chromium, 0.03-0.08 wt % nickel, and 900-1500 ppm oxygen, the balance being zirconium) and Zircaloy-4 (comprising 1.20-1.70 wt % tin, 0.18-0.24 wt % iron, 0.07-1.13 wt % chromium, 900-1500 ppm oxygen, and up to 0.007 wt % nickel, the balance being zirconium), which comprise tin (Sn), iron (Fe), chromium (Cr) and nickel (Ni), are most widely used.

However, in order to increase the economic efficiency of nuclear reactors, high burnup/extended cycle operations have recently been adopted, in which the cycle of nuclear fuel is extended to reduce the life-cycle cost of nuclear fuel. As the cycle of nuclear fuel is extended, the period during which nuclear fuel reacts with high-temperature and high-pressure water and steam is extended. For this reason, when Zircaloy-2 and Zircaloy-4 are used as materials for nuclear fuel claddings, a problem occurs in that the phenomenon of corrosion due to nuclear fuel becomes severe.

Accordingly, there is an urgent need to develop materials, which have excellent corrosion resistance to high-temperature and high-pressure water and steam, and thus can be used in nuclear fuel assemblies for high burnup/extended cycle operations. Thus, many studies focused on the development of zirconium alloys having improved corrosion resistance have been conducted. Herein, because the corrosion resistance of zirconium alloys is greatly influenced by the kind and amount of additional elements, processing conditions, heat treatment conditions, and the like, it is particularly important to establish optimal conditions that show excellent corrosion resistance.

With respect to major patents relating to nuclear fuel assemblies for high-burnup/extended cycle operations, which were registered after the middle of the 1980s, zirconium alloys mostly comprise iron, which can improve corrosion resistance, even when it is added in trace amounts. Also, in Fe-containing zirconium alloy compositions, it is a general tendency to increase the amount of added iron and to add other elements that have an effect of improving corrosion resistance. That is, zirconium alloys for high burnup/extended cycle nuclear fuels essentially contain a high concentration of iron, and optimal preparation processes thereof are established such that the zirconium alloys exhibit excellent performance.

U.S. Pat. No. 5,648,995 discloses a method for preparing a zirconium alloy comprising 0.005-0.025 wt % iron, 0.8-1.3 wt % niobium, 0.16 wt % and less of oxygen, 0.02 wt % and less of carbon, 0.012 wt % and less of silicon, and the balance of zirconium. This patent attempts to improve creep resistance by restricting the content of iron to within a range of very low values.

U.S. Pat. No. 5,112,573 discloses a process for preparing a zirconium alloy, having iron content higher than that of U.S. Pat. No. 5,648,995, and comprising 0.07-0.14 wt % iron, 0.5-2.0 wt % niobium, 0.7-1.5 wt % tin, 0.03-0.14 wt % nickel or chromium, 0.022 wt % and less of carbon, and the balance of zirconium.

U.S. Pat. No. 5,125,985 and U.S. Pat. No. 5,266,131 relate to a manufacturing process, in which a "late stage" beta-quenching process is performed during the cold processing of a zirconium alloy having the same composition as that of U.S. Pat. No. 5,112,573. These patents attempt to improve creep resistance and corrosion resistance.

U.S. Pat. No. 5,940,464 discloses an alloy composition having iron content about 20 times higher than that of U.S. Pat. No. 5,648,995, and comprising 0.02-0.4 wt % iron, 0.8-1.8 wt % niobium, 0.2-0.6 wt % tin, 30-180 ppm carbon, 10-120 ppm silicon, 600-1800 ppm oxygen, and the balance of zirconium, as well as a preparation process thereof. This patent attempts to improve corrosion resistance and creep resistance.

U.S. Pat. No. 5,211,774 discloses an alloy composition comprising 0.2-0.5 wt % iron, 0.8-1.2 wt % tin, 0.1-0.4 wt % chromium, 0-0.6 wt % niobium, 50-200 ppm silicon, 900-1800 ppm oxygen, and the balance of zirconium, as well as a preparation process thereof. This patent attempts to reduce the variations in corrosion resistance according to the absorption of hydrogen by changing the content of silicon in the alloy and the difference of the process.

U.S. Pat. No. 5,254,308 discloses an alloy composition that maintains its mechanical properties due to a decrease in the content of tin, and comprises 0.4-0.53 wt % iron, 0.45-0.75 wt % tin, 0.2-0.3 wt % chromium, 0.3-0.5 wt % niobium, 0.012-0.03 wt % nickel, 50-200 ppm silicon, 1000-2000 ppm oxygen, and the balance of zirconium. The above patent, the iron/chromium ratio was controlled to be 1.5, the added amount of niobium was determined by the added amount of iron which affects the hydrogen absorption property of the alloy. Further, the added amount of nickel, silicon, carbon, and oxygen was determined to provide excellent corrosion resistance and strength.

U.S. Pat. No. 5,560,790 discloses an alloy composition comprising 0.3-0.6 wt % iron, 0.5-1.5 wt % niobium, 0.9-1.5 wt % tin, 0.005-0.2 wt % chromium, 0.005-0.04 wt % carbon, 0.05-0.15 wt % oxygen and 0.005-0.015 wt % silicon. In this patent, the interparticle distance between intermetallides ($Zr(Nb,Fe)_2$, $Zr(Fe,Cr,Nb)$ and $(Zr,Nb)_3Fe$) is 0.20-0.40 μm, and the intermetallides are at least 60 volume percent of the total amount of ferriferous intermetallides.

In Europe Patent No. 198,570, the content of niobium in a binary alloy consisting of zirconium-niobium is limited to 1.0-2.5 wt %. This patent also discloses that the temperature of heat treatment performed during a process for preparing the alloy can lead to improved corrosion resistance.

U.S. Pat. No. 5,125,985 discloses an alloy comprising: 0.5-2.0 wt % niobium; 0.7-1.5 wt % tin; and 0.07-0.28 wt % of at least one element selected from among iron, chromium and nickel. Also, this patent discloses that the creep resistance of the material can be controlled by subjecting the material to various treatment processes.

As described above, there have been continued efforts to improve the corrosion resistance and mechanical properties of zirconium alloys used as materials for nuclear fuel assemblies in nuclear powder plants. However, zirconium alloys having further improved corrosion resistance, which can secure the integrity of nuclear fuel in high burnup/extended cycle operations, are continually required in consideration of the tendency toward high burnup/expended cycle operations, in which the cycle of nuclear fuel is expanded to increase the economic efficiency of power plants, and the target burnup is increased.

Accordingly, the present inventors have conducted many studies to improve accelerated corrosion phenomena, which are most problematic when nuclear fuel claddings, spacer grids and structures, made of zirconium alloys, are used in high burnup/extended cycle operations. As a result, the present inventors have found that a zirconium alloy composition, containing 0.5-1.0 wt % iron and prepared using varying kinds of additional elements through an optimized preparation process, has excellent corrosion resistance compared to the prior Zircaloy alloys, thereby completing the present invention.

SUMMARY OF THE INVENTION

The present invention has been made in view of the above-described problems occurring in the prior art, and it is an object of the present invention to provide a high Fe-containing zirconium alloy composition having excellent corrosion resistance, which can be used as a material for nuclear fuel claddings, spacer grids and structures, which are used in high burnup/extended cycle operations.

Another object of the present invention is to provide a method for preparing the high Fe-containing zirconium alloy composition.

To achieve the above objects, in one aspect, the present invention provides a high Fe-containing zirconium alloy composition having excellent corrosion resistance, the composition comprising: 0.5-1.0 wt % iron; 0.25-0.5 wt % chromium; 0.06-0.18 wt % oxygen; at least one element selected from the group consisting of 0.2-0.5 wt % tin, 0.1-0.3 wt % niobium and 0.05-0.3 wt % copper; and the balance of zirconium.

In another aspect, the present invention provides a method for preparing a high Fe-containing zirconium alloy composition, the method comprising the steps of:

(1) melting a mixture of elements for forming a zirconium alloy to prepare an ingot;

(2) forging the ingot of step (1) in the β-phase region;

(3) subjecting the forged ingot of step (2) to solution heat treatment in the β-phase region, followed by quenching;

(4) extruding the quenched ingot of step (3);

(5) subjecting the extruded shell of step (4) to initial heat treatment;

(6) subjecting the heat-treated shell of step (5) to cold working and intermediate heat treatment several times repeatedly; and (7) subjecting the zirconium alloy composition of step (6) to final heat treatment.

DETAILED DESCRIPTION OF THE INVENTION

Hereinafter, the present invention will be described in detail.

The zirconium alloy composition according to the present invention preferably comprises: 0.5-1.0 wt % iron; 0.25-0.5 wt % chromium; 0.06-0.18 wt % oxygen; at least one element selected from the group consisting of 0.2-0.5 wt % tin, 0.1-0.3 wt % niobium and 0.05-0.3 wt % copper; and the balance of zirconium. More preferably, the zirconium alloy composition according to the present invention comprises: 0.54-0.8 wt % iron; 0.27-0.40 wt % chromium; 0.1-0.15 wt % oxygen; at least one element selected from the group consisting of 0.2-0.5 wt % tin, 0.1-0.3 wt % niobium and 0.05-0.3 wt % copper; and the balance of zirconium.

The most important problem to be solved in nuclear fuel assemblies for high burnup/extended cycle operations is the rapid increase in surface corrosion caused by a high heat flux in nuclear reactor conditions and an increase in exposure time. The increase in corrosion means an increase in oxide layers having high brittleness, and furthermore, increases the absorption of hydrogen into a matrix metal to thus damage the structural integrity of nuclear fuel rods. Thus, the development of a cladding material having excellent corrosion resistance can contribute directly to the improvement in the economy and safety of light water reactor and heavy water reactor in the nuclear power plants. In the present invention, iron, which is known to contribute directly to the improvement in the corrosion resistance of zirconium alloys, was added at high concentrations so as to inhibit corrosion in high burnup/extended cycle operation environments, and tin, copper and niobium were additionally added so as to further improve corrosion resistance.

Hereinafter, each of the alloying elements of the zirconium alloy composition according to the present invention will be explained.

Iron (Fe) is a major element, which is added in order to improve the corrosion resistance of zirconium alloys. It was reported that, when more than 0.3 wt % iron is added to a zirconium alloy, the corrosion resistance of the zirconium alloy is improved [F. Garzarolli, et al., Zirconium in the Nuclear Industry, ASTM STP 1295 (1996) pp. 23-32].

Accordingly, in the present invention, iron was added to the zirconium alloy composition in an amount of more than 0.5 wt %. However, because iron content higher than 1.0 wt % causes a problem of workability, the content of iron in the zirconium alloy composition of the present invention is preferably 0.5-1.0 wt %.

Chromium (Cr) is a major element that improves the corrosion resistance of alloys in the same manner as iron, and it is known that chromium should be added in an amount of more than 0.2 wt % in order to improve corrosion resistance [F. Garzarolli et al. ASTM-STP 1245 (1994) p. 709].

Meanwhile, it is known that the iron/chromium ratio influences corrosion resistance, and particularly, an increase in the iron/chromium ratio leads to the improvement in corrosion resistance [C. M. Eucken et al., ASTM STP 1023 (1989) p. 113]. Herein, the iron/chromium ratio is preferably 1.5-3. If the iron/chromium ratio is less than 1.5 or more than 3, there will be a problem in that corrosion resistance is reduced. Thus, the content of chromium in the alloy composition according to the present invention is preferably 0.25-0.5 wt %.

Oxygen (O) serves to increase mechanical strength due to solid solution strengthening. However, if it is added in excessive amounts, it will cause processing problems. Thus, oxygen is preferably added in an amount of 0.06-0.18 wt %.

Tin (Sn) is known to be an element that stabilizes the α-phase in zirconium alloys, and it serves to increase mechanical strength due to solid solution strengthening. However, if it is added in excessive amounts, it will reduce corrosion resistance. Thus, it is preferably added in an amount of 0.2-0.5 wt %, at which corrosion resistance is not greatly reduced.

Niobium (Nb) acts to greatly improve the corrosion resistance of zirconium alloys. However, if it is added at a high concentration of more than 0.3 wt %, an improvement in corrosion resistance can be expected only when the size and composition of precipitates are controlled by using a specific heat treatment temperature and time [Y. H. Jeong et al. J. Nucl Mater. vol 317 p. 1]. In consideration of this fact, the content of niobium in the zirconium alloy composition according to the present invention is preferably 0.1-0.3 wt %.

Copper (Cu) is a major element that is added to improve the corrosion resistance of alloys in the same manner as iron and chromium. It shows excellent effects, particularly when it is added in trace amounts [B. O. Choi et al. J. Kor. Inst. Met. & Mater. vol 42 (2004) p. 178]. Thus, the content of copper in the zirconium alloy composition according to the present invention is preferably 0.05-0.3 wt %.

Also, the present invention provides a method for preparing a high Fe-containing zirconium alloy composition, the method comprising the steps of:

(1) melting a mixture of elements for forming a zirconium alloy to prepare an ingot;

(2) forging the ingot of step (1) in the β-phase region;

(3) subjecting the forged ingot of step (2) to solution heat treatment in the β-phase region, followed by quenching;

(4) extruding the quenched ingot of step (3);

(5) subjecting the extruded shell of step (4) to initial heat treatment;

(6) subjecting the heat-treated shell of step (5) to cold working and intermediate heat treatment several times repeatedly to prepare a zirconium alloy composition; and (7) subjecting the zirconium alloy composition of step (6) to final heat treatment.

Hereinafter, each step of the preparation method according to the present invention will be described in detail.

First, step (1) is a step of melting a mixture of the elements for forming a zirconium alloy to prepare an ingot.

The ingot is preferably prepared using a vacuum arc remelting (VAR) method. Specifically, the ingot is prepared in the form of a button or the like by maintaining a vacuum state in a chamber at $1\times10^{-5}$ Torr, injecting 0.1-0.3 Torr of argon (Ar) gas into the chamber, applying an electric current of 500-1000 A to the elements in the chamber to melt the elements, and cooling the melt.

In this step, it is preferable to repeat the melting process 3-5 times, in order to prevent impurities from segregating and the alloy composition from being non-uniformly distributed in the ingot. In the cooling process, it is preferable to perform cooling by injecting inert gas, such as argon, in order to prevent oxidation from occurring on the sample surface.

Then, step (2) is a step of forging the ingot of step (1) in the β-phase region.

This step can be performed by forging the ingot in the β-phase region at a temperature of 1000° C. in order to break the cast structure of the ingot. Preferably, the forging process is carried out at a temperature of 1000-1200° C. If the forging temperature is lower than 1000° C., there will be a problem in that the cast structure is not easily broken, and if it is higher than 1200° C., there will be a problem in that heat treatment cost is increased.

Then, step (3) is a step of subjecting the forged ingot from step (2) to solution heat treatment in the β-phase region, followed by quenching.

In this step, in order to homogenize the alloy composition in the ingot and to obtain fine precipitates, the ingot is subjected to solution heat treatment in the β-phase region and quenched. In this step, in order to prevent the oxidation of the sample, the sample is sealed with a stainless steel plate, and then preferably subjected to heat treatment at a temperature of 1000-1200° C., and more preferably 1050-1100° C. The heat treatment time is preferably about 5-40 minutes, and more preferably 10-25 minutes. After the heat treatment, the ingot is quenched in the β-phase region using water at a temperature of 400° C. or lower, preferably 300-400° C.

Then, step (4) is a step of extruding the quenched ingot of step (3).

The ingot quenched in step (3) is processed into a hollow billet, which is then subjected to hot extrusion to prepare an extruded shell suitable for cold working. In step (4), the extrusion time is preferably 20-40 minutes, and more preferably 30 minutes. The extrusion temperature is preferably 550-700° C. If the extrusion is performed at a temperature outside of this temperature range, it is difficult to obtain an extruded shell suitable for working in subsequent steps.

Then, step (5) is a step of subjecting the extruded shell of step (4) to initial heat treatment.

The initial heat treatment temperature is set to 700° C. or below. Specifically, the extruded shell is preferably subjected to initial heat treatment at 550-700° C. for 1-5 hours. More preferably, the extruded shell is subjected to initial heat treatment at 560-690° C. for 2-4 hours. If the initial heat treatment temperature is less than 550° C., workability problems will occur, and if it exceeds 700° C., there will be a problem in that coarse precipitates are formed, which reduces corrosion resistance.

Then, step (6) is a step of subjecting the heat-treated shell of step (5) to cold working and intermediate heat treatment several times repeatedly to prepare a zirconium alloy composition.

The cold working and intermediate heat treatment of step (6) can be achieved by subjecting the heat-treated shell of step (5) to cold working 2-5 times and subjecting the heat-treated shell to intermediate heat treatment 1-4 times between the cold-working passes. Herein, the intermediate heat treatment is preferably performed at 550-700° C. for 3-5 hours. If the heat treatment temperature is less than 550° C., workability problems will occur, and if it exceeds 700° C., there will be a problem in that coarse precipitates are formed, thus reducing corrosion resistance. Also, the cold working rate in the cold-working process is preferably 20-85%. Specifically, it is more preferable that the first-order cold working rate be 20-80%, the second-order cold working rate be 30-85%, and the third-order working rate be 35-85%. If the cold working rate is less than 20%, a problem will result in that a product having the desired thickness cannot be obtained, and if it exceeds 85%, workability problems will occur.

Then, step (7) is a step of subjecting the prepared zirconium alloy composition to final heat treatment.

This step is performed to increase the creep resistance of the composition through cold working. The final heat treatment at this step is preferably carried out in a vacuum at a temperature of 450-580° C. for 2-10 hours. If the final heat treatment temperature is less than 450° C., there will be a problem in that creep resistance is reduced, and if it exceeds 580° C., there will be a problem in that mechanical strength is reduced. Also, if the heat treatment time is less than 2 hours, there will be a problem in that the worked structures remain, and if it exceeds 10 hours, there will be a problem in that precipitates become coarse, thus reducing corrosion resistance.

Hereinafter, the present invention will be described with reference to examples. It is to be understood, however, that these examples are illustrative only and that the scope of the present invention is not limited thereto.

Example 1

Preparation of Zirconium Alloy Composition (1) Preparation of Ingot 0.6 wt % iron, 0.3 wt % chromium, 0.12 wt % oxygen, 0.05 wt % copper and the balance zirconium were melted using a vacuum arc remelting (VAR) method, thus preparing an ingot. The zirconium used was sponge zirconium for nuclear applications, specified in ASTM B349, and the alloying elements had a high purity more than 99.99%. Also, silicon and oxygen were first melted together with sponge zirconium to prepare a mother alloy, which was then added in the desired amount during the melting of the ingot. In order to prevent impurities from being segregated or the alloy composition from being non-uniformly distributed, the melting process was repeated four times. Also, in order to prevent the alloy composition from being oxidized during the melting process, the vacuum in a chamber was maintained at a sufficient vacuum level of $1 \times 10^{-5}$ torr, and then high-purity 99.99%) argon gas was injected into the chamber. In this state, an electric current of 500 A was applied. Thus, the ingot was prepared in a water-cooling copper crucible having a water pressure of 1 kgf/cm$^2$ and a diameter of 60 mm.

(2) Forging

In order to break the cast structures of the above-prepared ingot, the ingot was forged in the β-phase region at 1100° C.

(3) β-Quenching

In order to break the cast structures of the above-prepared ingot, the ingot was subjected to solid heat treatment in the β-phase region at 1050° C. for 15 minutes. After completion of the solid heat treatment, the ingot was quenched by dropping it into a water bath filled with room-temperature water, thus forming the martensite structure or the widmanstatten structure.

(4) Hot Working

The β-quenched material was processed into a hollow billet, which was then subjected to hot extrusion at 600° C. for 30 minutes, thus preparing an extruded shell suitable for cold working.

(5) Initial Heat Treatment

The hot-extruded material was subjected to initial heat treatment at 600° C. for 2 hours.

(6) Cold Working and Intermediate Heat Treatment

The extruded material was cold worked and subjected to intermediate heat treatment in a vacuum at 570° C. for 2 hours. Then, the heat-treated, extruded material was subjected to second-order cold working and subjected again to intermediate heat treatment in a vacuum at 570° C. for 2 hours. Then, the heat-treated, extruded material was subjected to third-order cold working. In the cold working, the first-order cold working rate was 30%, the second-order cold working rate was 40%, and the third-order cold working rate was 60%.

(7) Final heat treatment

The high Fe-containing zirconium alloy composition was subjected to final heat treatment in a vacuum at 470° C. for 3 hours.

Example 2

This Example was performed in the same manner as in Example 1, except that 0.2 wt % niobium was added instead of copper, among the contents of the zirconium alloy composition.

Example 3

This Example was performed in the same manner as in Example 1, except that copper, among the contents of the zirconium alloy composition, was added in an amount of 0.1 wt %, and the final heat treatment was performed at a temperature of 490° C.

Example 4

This Example was performed in the same manner as in Example 3, except that 0.4 wt % tin was added instead of copper, among the contents of the zirconium alloy composition.

Example 5

This Example was performed in the same manner as in Example 3, except that 0.2 wt % niobium was added instead of copper, among the contents of the zirconium alloy composition.

Example 6

This Example was performed in the same manner as in Example 3, except that 0.4 wt % tin and 0.2 wt % niobium were added instead of copper, among the contents of the zirconium alloy composition.

Example 7

This Example was performed in the same manner as in Example 1, except that 0.2 wt % tin was added instead of copper, among the contents of the zirconium alloy composition, and that the final heat treatment was performed at a temperature of 510° C.

Example 8

This Example was performed in the same manner as in Example 7, except that 0.2 wt % niobium was added instead of tin, among the contents of the zirconium alloy composition.

Example 9

This Example was performed in the same manner as in Example 1, except that 0.1 wt % copper and 0.2 wt % tin were added instead of copper, among the contents of the zirconium alloy composition, the hot working and the final heat treatment were performed at a temperature of 680° C., and the intermediate heat treatment was performed at a temperature of 630° C.

Example 10

This Example was performed in the same manner as in Example 9, except that 0.2 wt % niobium was added instead of copper and tin, among the contents of the zirconium alloy composition.

Example 11

This Example was performed in the same manner as in Example 4, except that the final heat treatment was performed at a temperature of 490° C.

Example 12

This Example was performed in the same manner as in Example 11, except that 0.2 wt % niobium was added instead of tin, among the contents of the zirconium alloy composition.

Example 13

This Example was performed in the same manner as in Example 11, except that 0.4 wt % tin and 0.2 wt % niobium were added instead of tin, among the contents of the zirconium alloy composition.

Example 14

This Example was performed in the same manner as in Example 11, except that the final heat treatment was performed at a temperature of 510° C.

COMPARATIVE EXAMPLE 1

The commercial Zircaloy-4 alloy, which is used as a material for nuclear fuel structures in nuclear power plants, was used in this Comparative Example.

The above-described zirconium alloy compositions are shown in Table 1 below.

TABLE 1

Analysis of chemical composition

| Examples | Iron (wt %) | Chromium (wt %) | Oxygen (wt %) | Copper (wt %) | Tin (wt %) | Niobium (wt %) | Zirconium (wt %) |
|---|---|---|---|---|---|---|---|
| Example 1 | 0.6 | 0.3 | 0.12 | 0.05 | — | — | Balance |
| Example 2 | 0.6 | 0.3 | 0.12 | — | — | 0.2 | Balance |
| Example 3 | 0.6 | 0.3 | 0.12 | 0.1 | — | — | Balance |
| Example 4 | 0.6 | 0.3 | 0.12 | — | 0.4 | — | Balance |
| Example 5 | 0.6 | 0.3 | 0.12 | — | — | 0.2 | Balance |
| Example 6 | 0.6 | 0.3 | 0.12 | — | 0.4 | 0.2 | Balance |
| Example 7 | 0.6 | 0.3 | 0.12 | — | 0.2 | — | Balance |
| Example 8 | 0.6 | 0.3 | 0.12 | — | — | 0.2 | Balance |
| Example 9 | 0.6 | 0.3 | 0.12 | 0.1 | 0.2 | — | Balance |
| Example 10 | 0.6 | 0.3 | 0.12 | — | — | 0.2 | Balance |
| Example 11 | 0.6 | 0.3 | 0.12 | — | 0.4 | — | Balance |
| Example 12 | 0.6 | 0.3 | 0.12 | — | — | 0.2 | Balance |
| Example 13 | 0.6 | 0.3 | 0.12 | — | 0.4 | 0.2 | Balance |
| Example 14 | 0.6 | 0.3 | 0.12 | — | — | 0.2 | Balance |
| Comparative Example 1 (Zircaloy-4) | 0.2 | 0.1 | 0.12 | — | 1.5 | — | Balance |

The temperatures of the steps of Examples for preparing said compositions are shown in Table 2 below.

TABLE 2

| | Hot working temperature (° C.) | Initial heat treatment (° C.) | Intermediate heat treatment (° C.) | Final heat treatment (° C.) |
|---|---|---|---|---|
| Example 1 | 600 | 600 | 570 | 470 |
| Example 2 | 600 | 600 | 570 | 470 |
| Example 3 | 600 | 600 | 570 | 490 |
| Example 4 | 600 | 600 | 570 | 490 |
| Example 5 | 600 | 600 | 570 | 490 |
| Example 6 | 600 | 600 | 570 | 490 |
| Example 7 | 600 | 600 | 570 | 510 |
| Example 8 | 600 | 600 | 570 | 510 |
| Example 9 | 680 | 680 | 630 | 470 |
| Example 10 | 680 | 680 | 630 | 470 |
| Example 11 | 680 | 680 | 630 | 490 |
| Example 12 | 680 | 680 | 630 | 490 |
| Example 13 | 680 | 680 | 630 | 490 |
| Example 14 | 680 | 680 | 630 | 510 |
| Comparative Example 1 | 680-720 | 680-720 | 680-720 | 465 |

TEST EXAMPLE 1

Corrosion Test

In order to examine the corrosion resistance of the high Fe-containing zirconium alloy compositions according to the present invention, the following corrosion test was performed.

The zirconium alloys of Examples 1-14 and Comparative Example 1 were used to fabricate test samples having a length of 50 mm. The test samples were immersed in a solution of water: nitric acid:hydrofluoric acid (HF) (50:40:10 (v/v)) to remove impurities and fine defects from the surfaces thereof. Immediately before the surface-treated samples were loaded into an autoclave, the surface areas and initial weights thereof were measured. Then, the test samples were allowed to corrode in water at 360° C. and steam at 400° C. for 500 days, and then the increase in the weight of each of the samples was measured. The corrosion of each of the test samples was quantitatively estimated by calculating the increase in weight per unit surface area. The corrosion test results are shown in Table 3 below.

TABLE 3

| | Increase in weight (mg/dm$^2$) | |
|---|---|---|
| | Water at 360° C. | Steam at 400° C. |
| Example 1 | 51 | 80 |
| Example 2 | 54 | 95 |
| Example 3 | 50 | 79 |

TABLE 3-continued

|  | Increase in weight (mg/dm$^2$) | |
| --- | --- | --- |
|  | Water at 360° C. | Steam at 400° C. |
| Example 4 | 56 | 106 |
| Example 5 | 53 | 121 |
| Example 6 | 55 | 103 |
| Example 7 | 50 | 78 |
| Example 8 | 53 | 129 |
| Example 9 | 53 | 83 |
| Example 10 | 72 | 154 |
| Example 11 | 58 | 113 |
| Example 12 | 95 | 158 |
| Example 13 | 64 | 116 |
| Example 14 | 112 | 165 |
| Comparative Example 1 | 137 | 190 |

As can be seen in Table 3, the zirconium alloys of Examples 1-14, made of the zirconium alloy compositions according to the present invention, showed an increase of 50-112 mg/dm$^2$ in the weight thereof in the water environment. This increase in weight was lower than the Zircaloy-4 (137 mg/dm$^2$) of Comparative Example 1, suggesting that the zirconium alloys of the present invention had excellent corrosion resistance. Also, in the steam environment, the zirconium alloys of the present invention showed an increase of 78-165 mg/dm$^2$ in the weight thereof, which was lower than the Zircaloy-4 (190 mg/dm$^2$) of Comparative Example 1, suggesting that the zirconium alloys of the present invention had excellent corrosion resistance.

In particular, increases in weight were compared between Examples 3, 4, 5 and 6, in which additional elements other than iron, chromium and oxygen were added to the zirconium alloys at the same thermal treatment temperature. As a result, the zirconium alloy of Example 3, containing only copper, among the other additional elements, showed the lowest increase in weight (increase in weight: 50 mg/dm$^2$). Also, the zirconium alloys containing a small amount of tin (Example 4; increase in weight: 56 mg/dm$^2$), niobium (Example 5; increase in weight: 56 mg/dm$^2$) or a combination of niobium and tin (Example 6; increase in weight: 55 mg/dm$^2$) showed slightly higher increases in weight compared to the case of Example 3, but had significantly increased corrosion resistance compared to the commercial Zircaloy-4 (Comparative Example 1; increase in weight: 137 mg/dm$^2$).

Moreover, in order to examine the effect of thermal treatment temperature on corrosion resistance, a comparison between Example 5 and Example 12 was made. The zirconium alloy of Example 5, performed at a hot working temperature of 600° C., an initial heat treatment temperature of 600° C. and an intermediate heat treatment temperature of 570° C., showed an increase of 56 mg/dm$^2$ in the weight thereof, which was lower than an increase of 95 mg/dm$^2$ in weight in the case of the zirconium alloy of Example 12, performed at a hot working temperature of 680° C., an initial heat treatment temperature of 680° C. and an intermediate heat treatment temperature of 630° C. Thus, it could be seen that the temperatures in the preparation method of the present invention led to an improvement in the corrosion resistance of the zirconium alloy composition.

In particular, from the comparison between Example 2 (increase in weight: 54 mg/dm$^2$) and Example 8 (increase in weight: 53 mg/dm$^2$), it could be seen that the increase in the final heat treatment temperature did not lead to a further increase in the weight. The low increase in weight, as noted above, means that the final heat treatment does not influence corrosion resistance. Accordingly, the corrosion resistance of the zirconium alloy according to the present invention would not be reduced even after the final heat treatment, which is performed to increase creep resistance.

As described above, the high Fe-containing zirconium alloy composition according to the present invention is imparted with improved corrosion resistance by suitably controlling the kind and addition amount of additional elements and performing heat treatment. Accordingly, the zirconium alloy composition of the present invention is useful as a material for nuclear fuel claddings, spacer grids and nuclear reactor core structures in light water reactor and heavy water reactor nuclear power plants.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A high Fe-containing zirconium alloy composition having excellent corrosion resistance, the composition consisting essentially of: 0.6-1.0 wt % iron; 0.3-0.5 wt % chromium; 0.06-0.18 wt % oxygen; 0.05-0.3 wt % copper; 0.2-0.5 wt % tin and the balance of zirconium.

2. The zirconium alloy composition of claim 1, which consists essentially of: 0.6-0.8 wt % iron, 0.3-0.40 wt % chromium, 0.1-0.15 wt % oxygen, 0.05-0.3 wt % copper, 0.2-0.5 wt % tin, and the balance of zirconium.

3. A high Fe-containing zirconium alloy composition having excellent anti-corrosiveness according to claim 1, wherein the alloy is manufactured by the method comprising the steps of:
   (1) melting a mixture of elements for forming a zirconium alloy to prepare an ingot;
   (2) forging the ingot of the step (1) in the β-phase region;
   (3) subjecting the forged ingot of the step (2) to solution heat treatment in the β-phase region, followed by quenching;
   (4) extruding the quenched ingot of the step (3);
   (5) subjecting the extruded shell of the step (4) to initial heat treatment;
   (6) subjecting the heat-treated shell of the step (5) to cold working and intermediate heat treatment several times repeatedly, to prepare a zirconium alloy composition; and
   (7) subjecting the zirconium alloy composition of the step (6) to final heat treatment.

4. A high Fe-containing zirconium alloy composition having excellent anti-corrosiveness according to claim 3, wherein the extrusion in the step (4) is performed at a temperature of 550-700° C. for 20-40 minutes.

5. A high Fe-containing zirconium alloy composition having excellent anti-corrosiveness according to claim 3, wherein the initial heat treatment in the step (5) is performed at a temperature of 550-700° C. for 1-5 hours.

6. A high Fe-containing zirconium alloy composition having excellent anti-corrosiveness according to claim 3, wherein the final heat treatment in the step (7) is performed at 450-580° C. for 2-10 hours.

7. A method for preparing a high Fe-containing zirconium alloy composition of claim 1 having excellent corrosion resistance, the method comprising the steps of:
   (1) melting a mixture of elements for forming a zirconium alloy to prepare an ingot;
   (2) forging the ingot of the step (1) in the β-phase region;

(3) subjecting the forged ingot of the step (2) to solution heat treatment in the β-phase region, followed by quenching;

(4) extruding the quenched ingot of the step (3);

(5) subjecting the extruded shell of the step (4) to initial heat treatment;

(6) subjecting the heat-treated shell of the step (5) to cold working and intermediate heat treatment several times repeatedly, to prepare a zirconium alloy composition; and (7) subjecting the zirconium alloy composition of the step (6) to final heat treatment.

8. The method of claim 7, wherein the extrusion in the step (4) is performed at a temperature of 550-700° C. for 20-40 minutes.

9. The method of claim 7, wherein the initial heat treatment in the step (5) is performed at a temperature of 550-700° C. for 1-5 hours.

10. The method of claim 7, wherein the final heat treatment in the step (7) is performed at 450-580° C. for 2-10 hours.

* * * * *